(12) United States Patent
Snellman et al.

(10) Patent No.: US 9,605,398 B2
(45) Date of Patent: Mar. 28, 2017

(54) METHOD TO UTILIZE A SHIP IN A NOVEL WAY AND A MULTI-PURPOSE SHIP

(75) Inventors: Lars Snellman, Porvoo (FI); Kai Valtari, Espoo (FI); Hanna Suutarla, Hämeenlinna (FI)

(73) Assignee: ARCTIA SHIPPING OY, Helsinki (FI)

( * ) Notice: Subject to any disclaimer, the term of this patent is extended or adjusted under 35 U.S.C. 154(b) by 437 days.

(21) Appl. No.: 14/000,009

(22) PCT Filed: Feb. 16, 2012

(86) PCT No.: PCT/FI2012/000009
§ 371 (c)(1),
(2), (4) Date: Nov. 22, 2013

(87) PCT Pub. No.: WO2012/110686
PCT Pub. Date: Aug. 23, 2012

(65) Prior Publication Data
US 2014/0190901 A1    Jul. 10, 2014

(30) Foreign Application Priority Data
Feb. 16, 2011  (FI) ...................................... 20110053

(51) Int. Cl.
| E02B 15/04 | (2006.01) |
| B63B 35/10 | (2006.01) |
| B63B 35/32 | (2006.01) |
| B63B 39/03 | (2006.01) |

(52) U.S. Cl.
CPC ............ *E02B 15/046* (2013.01); *B63B 35/10* (2013.01); *B63B 35/32* (2013.01); *B63B 39/03* (2013.01); *E02B 15/047* (2013.01)

(58) Field of Classification Search
CPC ...... E02B 15/04; E02B 15/046; E02B 15/047; B63B 35/10; B63B 35/32; B63B 39/03
USPC ...... 210/747.6, 776, 170.05, 170.09, 170.11, 210/242.3, 923; 114/40, 122, 125
See application file for complete search history.

(56) References Cited

U.S. PATENT DOCUMENTS

| 3,192,888 A | * | 7/1965 | Field ............................. 114/125 |
| 3,559,610 A | * | 2/1971 | Viollet et al. ................ 114/125 |
| 3,844,944 A | * | 10/1974 | Mercuri ..................... 210/242.3 |
| 3,847,816 A | * | 11/1974 | DiPerna .................... 210/242.3 |
| 5,030,363 A | * | 7/1991 | Pole ........................... 210/242.3 |
| 5,040,918 A | * | 8/1991 | Taricco ........................... 210/923 |
| 5,160,638 A | * | 11/1992 | Petkovic ........................ 210/776 |

(Continued)

FOREIGN PATENT DOCUMENTS

| EP | 2042426 | * | 4/2009 |
| WO | WO 03/091093 | * | 11/2003 |

*Primary Examiner* — Christopher Upton
(74) *Attorney, Agent, or Firm* — Kubovcik & Kubovcik (57) ABSTRACT

A method to utilize an ice-breaker (10) in a novel way such that tanks of the anti-roll system and/or tanks (21, 22, 23 and 24) of the heeling system are used for recovering and/or processing oil (16) to be recovered from water. The oil is separated from water in a tank of the anti-roll system and/or a tank (21) of the heeling system of the ice-breaker, which tank contains warm water (15) and steam heat pipes (19). The tanks of the anti-roll system and/or tanks of the heeling system of the ice-breaker have separate oil recovery piping which is used when the heeling tanks of the ice-breaker are used for responding to an oil spill.

9 Claims, 5 Drawing Sheets

(56) References Cited

U.S. PATENT DOCUMENTS 7,150,835 B2 * 12/2006 Salmi et al. ............... 210/747.6
2010/0252508 A1 * 10/2010 Immonen ..................... 210/747

* cited by examiner

METHOD TO UTILIZE A SHIP IN A NOVEL WAY AND A MULTI-PURPOSE SHIP

OBJECT OF THE INVENTION

The object of the present invention is a method to utilize an ice-breaker or a vessel breaking ice in a novel way.

PRIOR ART

To utilize a ship in way differing from its original purpose is known for example such that a merchant vessel, naval auxiliary vessel, tanker or a supply vessel is seen with oil spill response equipment. In this way the ship can be used for responding to oil spills when necessary. This is made possible by the fact that such vessels usually have several existing cargo tanks, possibly even large ones, which can be utilized for recovering oil.

In icy conditions, usually only ice-breakers assisting merchant vessels or other ice-breaking vessels can operate effectively. The problem with ice-breakers in oil spill response, however, is that they do not have cargo tanks that could be connected to an oil recovery apparatus or in which the oil could be collected.

Method According to the Invention

The purpose of this invention is to create a method by which an ice breaker or an ice-breaking vessel can be utilized in a novel way.

Characteristics of a Method According to the Invention

A method according to the invention is characterized in that tanks of the anti-roll system and/or heeling system of an ice-breaker or ice-breaking vessel are used for recovering and/or processing and/or storage of oil to be recovered from water.

The method according to the invention is made possible by virtue of ice-breakers and/or ice-breaking vessels generally being equipped with specialized anti-roll systems and/or heeling systems, which other vessels usually do not have.

An anti-roll system and/or a heeling system comprises one or more pairs of tanks. In a pair of tanks, the tanks are located on opposite sides of the ship and there are connecting pipes for water and air between the tanks. One or more high-powered pumps is/are connected to the water pipe between the tanks. The system furthermore includes a control member for controlling the pumps. The functioning of anti-roll systems and/or heeling systems is based on the rapid transfer of water from a tank in the side of the ship to a tank on the opposite side of the ship.

Nearly all known vessels also have a ballast system affecting the draught and trim, i.e. the floating position of the vessel. In such a system, the tanks in a vessel are filled with and emptied of ballast water. The system is based on the gravitational force of the water and intended to optimize the cargo capacity of the vessel.

In addition to the above system, ice-breakers or ice-breaking vessels also have another, separate system. This system is an active anti-roll system, i.e. so-called interring system and/or heeling system. The purpose of an anti-roll system is, by means of water being pumped very rapidly from one tank into another, to decrease the rolling caused by regular wave motion. The purpose of a heeling system is, by means of water being pumped very rapidly from one tank into another, to heel the vessel and thus decrease the friction between the hull of the vessel and the ice in an ice-locked situation where ice is forcefully pressed against the side of the vessel. The system is based on the movement and transfer of water in the tanks, and its purpose is to mobilize the ship.

An anti-roll system and a heeling system can be combined so that they use the same tanks, pipes and pumps.

In this invention, the tanks of the active anti-roll system and/or heeling system of a vessel are used in an exceptional way such that the tanks of the anti-roll system and/or heeling system are utilized as oil recovery tanks.

An excellent vessel for responding to oil spills in winter conditions can be created by means of the invention. An ice-breaker can effectively break ice and has several tanks of the anti-roll system and/or the heeling system. The anti-roll system and/or heeling system tanks of ice-breakers are particularly well suited for recovering oil. The tanks are located under the main deck of the vessel and against the outer side of the vessel. Heeling tanks have a flat bottom, and their support structures are substantially located in a single tank wall only, i.e. in the outer wall. In new vessels, tanks can be made for dual purposes from the outset and thus achieve corresponding benefits in the space layout, for example. The location of the tanks improves their usability, as they can be easily accessed this way. The ventilation of tanks close to the deck can be easily realized, and the pipes required between the tanks are short. Installation of the piping and maintenance of the tanks is uncomplicated because manholes can be made to lead directly from the deck to the tanks. Furthermore, the anti-roll system and/or heeling system tanks of ice-breakers are usually located in the sides of the vessel, whereby the tanks have structurally necessary stiffeners mostly only in the outer tank walls. Such tanks are also easy to clean after being used for oil recovery.

As a vessel type, ice-breakers are well suited for responding to oil spills because they have a lot of deck space, good visibility from the bridge, are highly steerable, and can naturally operate well also in ice. By using the tanks of the anti-roll system and/or the heeling system of an ice-breaking vessel in a novel way, ice-breakers and other ice-breaking vessels can be utilized for an entirely new purpose, i.e. responding to oil spills, without having to build any separate tanks or other cargo capacity. This is highly advantageous, as it decreases the size of the multi-purpose vessel.

Because the oil recovery tanks to be used according to the method are pre-existing tanks of the anti-roll system and/or heeling system, also the subsequent modifications in the anti-roll system and/or heeling system tanks required by the change in application are easy to carry out and save a significant amount of space inside the vessel. New vessels can be fitted with tanks that already have a dual purpose from the outset. The use of space in the vessel thus becomes highly efficient and advantageous.

Embodiments of the Method According to the Invention

A preferred embodiment of the method according to the invention is characterized in that the recovered oil and/or water carried in with the oil is transferred in an ice-breaker from a tank of the anti-roll system and/or of the heeling system into another tank of the anti-roll system and/or of the heeling system to separate the oil from the water.

Separating oil from water in this way is possible in an ice-breaker or an ice-breaking vessel because they generally have several anti-roll system and/or heeling system tanks.

By means of the heeling tanks, the ice-breaker can be rolled about the longitudinal axis of the vessel such that the vessel can be freed from an ice ridge, for example.

Another preferred embodiment of the method according to the invention is characterized in that warm water is channelled into the first tank of the anti-roll system and/or first tank of the heeling system of the ice-breaker, onto which warm water the oil recovered from the surface of water and the water carried in with it is fed, and when the recovered oil has separated from the water and risen to the surface, water is drained via the bottom into another tank of the anti-roll system and/or tank of the heeling system.

A third preferred embodiment of the method according to the invention is characterized in that water and oil are separated in the ice-breaker in several sequential stages such that water is channelled from the bottom portion of the first tank of the anti-roll system and/or tank of the heeling system into the second tank of the anti-roll system and/or tank of the heeling system in the process, and after that, water is channelled from the bottom portion of the second tank of the anti-roll system and/or tank of the heeling system into the next, i.e. third tank of the anti-roll system and/or tank of the heeling system in the process.

A fourth preferred embodiment of the method according to the invention is characterized in that oil and/or water carried in with the oil fed into an ice-breaker's tank of the anti-roll system and/or tank of the heeling system is heated by means of steam or hot water, after which the oil and/or water carried in with the oil is transferred into the next tank of the anti-roll system and/or tank of the heeling system.

Decanting, i.e. separation of the recovered oil and water, takes place in the tanks of the anti-roll system and/or the tanks of the heeling system. Hot water is channelled from the cooling system of the main engines or from another system into the first recovery tank where the recovered water/oil mixture will settle by means of gravitation on top of it such that the water will settle below the oil. The water is pumped from the height of the tank bottom into the next tank or, via an oleometer located in an outlet pipe, into the sea. Decanting is continued as long as it is necessary. It is advantageous to carry out a process according to the invention for example in four tanks of the anti-roll system and/or tanks of the heeling system of an ice-breaker.

Pipes between the tanks are equipped with butterfly valves to control the movement of oil/water in the tanks. The valves are located in the engine compartments of the vessel, which ensures that they are readily accessible. Hot cooling water is also channelled onto the deck of the vessel, where it can be fed into the oil recovery apparatuses.

Ship According to the Invention

The object of the invention also includes a multipurpose ship which, as necessary, can be used for missions differing from conventional purposes, such as for responding to oil spills.

Characteristics of a Ship According to the Invention

A multi-purpose ship according to the invention is characterized in that the multi-purpose ship is an ice-breaker or an ice-breaking vessel with the tanks of its anti-roll system and/or tanks of its heeling system adapted for recovering and/or processing oil to be recovered from water.

The multi-purpose ship is according to the invention an ice-breaker or an ice-breaking vessel with tank capacity required for responding to oil spills such that the tanks are simultaneously a part of the anti-roll system and/or the heeling system. Thus the vessel can be built correspondingly smaller in size, resulting in several obvious benefits.

A preferred embodiment of the ship according to the invention is characterized in that connecting tunnels for air and water between the tanks of the anti-roll system and/or tanks of the heeling system and the related water pumps are, for the duration of the oil recovery measures, taken out of use and closed by means of blind flanges or similar, and piping and related valves and pumps suitable for the recovery, separation and transfer of oil are installed between the tanks, the pumps being most preferably screw pumps with stepless control.

In the preferred embodiment, two pumps are joined with the piping.

Another preferred embodiment of the ship according to the invention is characterized in that the oil collector includes a pump and a hose or a suitable pipe for recovering and feeding oil into a tank of the anti-roll system and/or into a tank of the heeling system of the ice-breaker, the tank being modified so as to be suitable for oil recovery.

A third preferred embodiment of the ship according to the invention is characterized in that the modified tank of the anti-roll system and/or tank of the heeling system has heating pipes, steam heat pipes or other heating systems for separating oil from water.

A fourth preferred embodiment of the ship according to the invention is characterized in that the stern portion of an ice-breaker has an auxiliary reel for launching and retrieval from the water of an oil containment boom used for responding to an oil spill.

When tanks of the anti-roll system and/or tanks of the heeling system of an ice-breaker or an ice-breaking vessel are used for the processing and/or collecting of the oil to be recovered, they require the following modifications:

Heating pipes, such as steam heat pipes, are installed in the tanks for the heating and/or decanting, i.e. separation of the recovered oil. The required heat is obtained from the vessel's own boilers, heat recovery equipment or similar, and the heating pipes from the heat source to the tanks, running outside the tanks, are insulated and equipped with shut-off valves. The tanks are additionally equipped with thermometers and drain valves. The connecting tunnels for air and water between the tanks of the anti-roll system and/or the heeling system are covered with blind flanges, and the pump is protected from oil. The blind flanges are fastened by bolts, for example, and are seen with handles. Ladder steps are furthermore installed in the tanks to make it easier to install the flange in the air tunnel. The tanks are ventilated such that venting pipes are installed in the tanks, and appropriate spark arresters therein.

Examples of Embodiments

In the following, the invention is described using examples with reference to the appended drawings, in which.

LIST OF FIGURES

DESCRIPTION OF THE FIGURES

Figure 1:
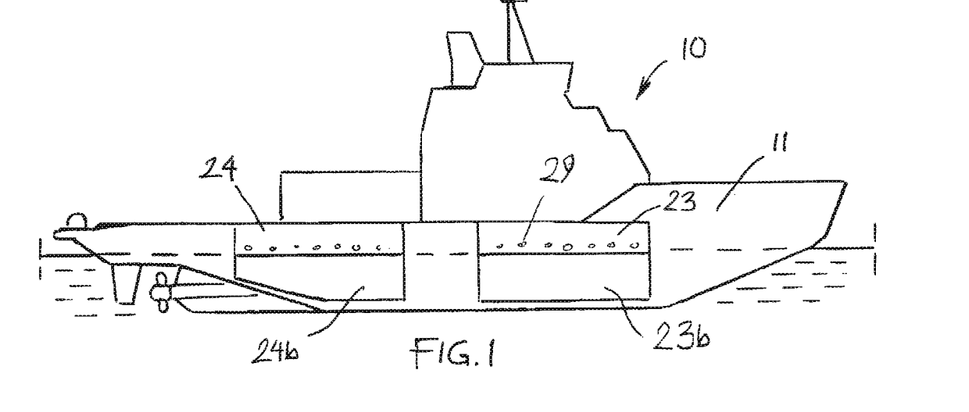
FIG. 1 is a schematic side view of an ice-breaker.
Figure 2:
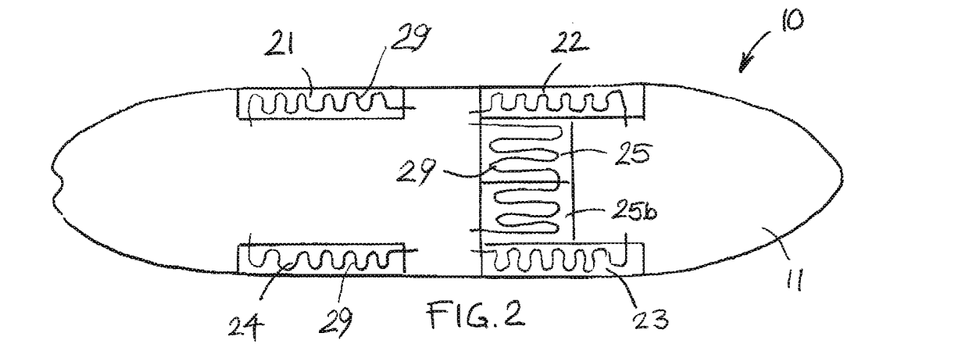
FIG. 2 is a schematic top view of the ice-breaker in FIG. 1.

FIG. 1 shows a schematic side view of an ice-breaker 10 with a solution marked in its hull 11, with tanks included in an anti-roll system and/or a heeling system. The heeling tanks 23 and 24 in the ice-breaker 10 are generally at the sides of the vessel, under the main deck in the hull 11. The example shown in FIG. 1 comprises four of these tanks 23 and 24, i.e. two at both sides in the hull 11 of the ice-breaker 10, as seen in FIG. 2. The height of the heeling tanks 23 and 24 can be equal to the height of the sides of the ship, but if the ice-breaker 10 has several systems, tanks for different purposes can also be located on top one another. The lowermost tanks 23b and 24b can also be ballast tanks 23b and 24b. According to the invention, the heeling tanks 23 and 24 are equipped with heating pipes 29 for oil recovery.

FIG. 2 shows the ice-breaker 10 of FIG. 1 as a top view. Its hull 11 includes four tanks 21, 22, 23 and 24 of the anti-roll system, two on each side. When used in their anti-roll capacity, there are connecting pipes and pumps between the tanks 21, 22, 23 and 24, whereby water can be moved from one tank to another to minimize the rolling motion caused by waves or, alternatively, to list or heel the vessel as required. The connecting pipes to move water and pumps are not shown in FIG. 2.

When the tanks 21, 22, 23 and 24 of the anti-roll system are used for responding to an oil spill, the tanks 21, 22, 23 and 24 hold recovered oil instead of water. For this purpose, the tanks 21, 22, 23 and 24 have heating pipes 29, by means of which the oil can be kept at a sufficiently low viscosity for transfer from one tank into another or for unloading, as shown in subsequent figures. The heating pipes 29 are most advantageously heated by means of hot steam or hot water which can be obtained from the cooling circuit of the ship engines.

The tanks 25 and 25b shown in FIG. 2 are fuel storage tanks of the vessel, which ordinarily contain heavy fuel oil, for example. It is advantageous that these tanks 25 and 25b have previously installed heating pipes 29 because heavy fuel oil also requires heating. Thus also these tanks 25 and 25b can be used for recovering oil.

Figure 3:
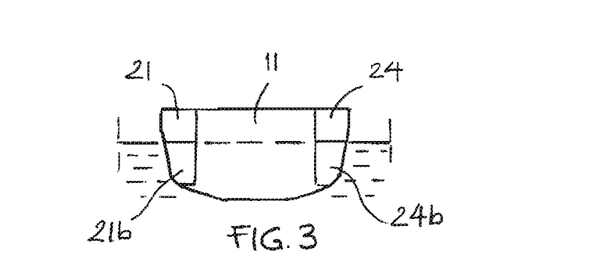
FIG. 3 is a cross-sectional view of the ice-breaker.

FIG. 3 shows a cross-sectional view of the ice-breaker 10 with the tanks 21 and 24 of the anti-roll system visible, and below them additional tanks 21b and 24b, which can be ballast tanks, for example. The connecting pipes and pumps between the tanks are not shown in FIG. 3.

Figure 4:
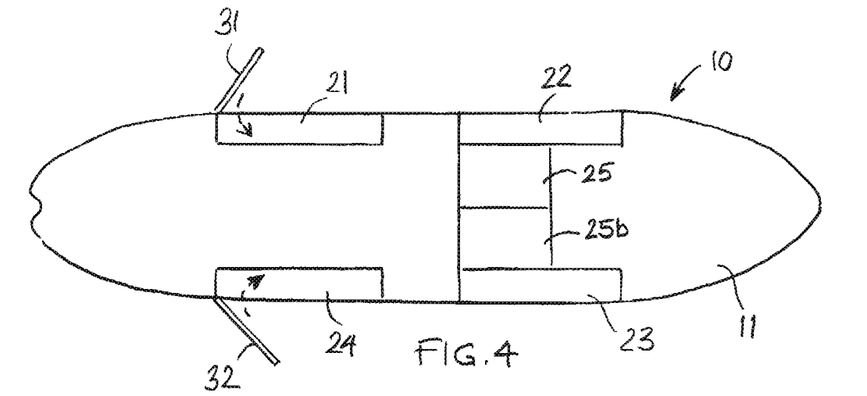
FIG. 4 is a schematic top view of an ice-breaker according to the invention, with oil recovery apparatuses on both sides.

FIG. 4 shows a top view of the ice-breaker 10 according to the invention, with oil recovery apparatuses 31 and 32 on both sides of the hull 11. The oil recovery apparatuses 31 and 32 of FIG. 4 are rigid booms, with the actual oil collector inside them.

According to the invention, oil collected from the water by the oil recovery apparatuses 31 and 32 and the water carried in with it is channelled into the tanks 21 and 24 of the anti-roll system located farthest astern in the hull 11 of the ice-breaker 10. According to the invention, the tanks 21 and 24 have piping to move water for anti-roll purposes and another set of piping for collecting and moving oil when responding to an oil spill. The tanks 21 and 24 are thus multipurpose tanks.

When recovering oil, warm water is channelled into the tanks 21 and 24, onto which the recovered oil is pumped. By means of heating pipes located in the tanks 21 and 24, such as steam heat pipes, the oil and water can effectively be separated from each other, whereby the oil will rise to the surface. The water separated onto the bottom of the tanks 21 and 24 is pumped into other tanks, most advantageously into the tanks 23 and 22 located at the opposite sides of the hull 11 of the ice-breaker 10, and further returned overboard if its oil content is sufficiently low.

Figure 5:
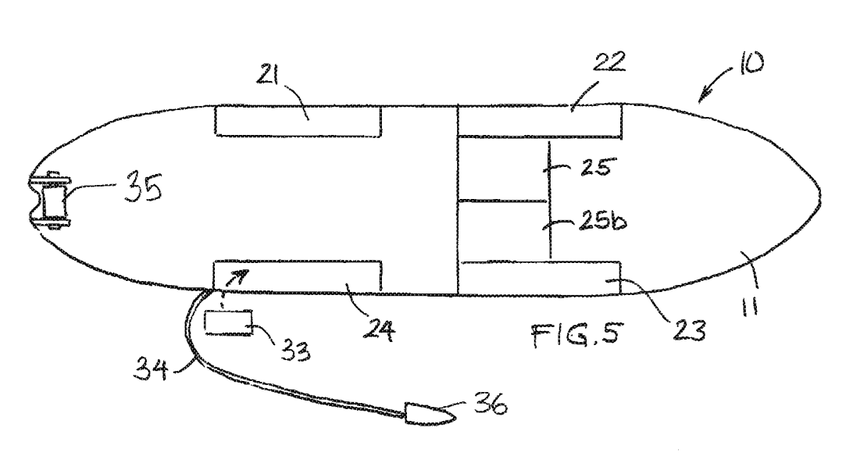
FIG. 5 is a top view of an ice-breaker according to the invention, with an oil recovery apparatus on one side.

FIG. 5 shows a top view of the ice-breaker 10 according to the invention, with an oil recovery apparatus 33 and an offshore boom 34 at one side of the hull 11. The offshore boom 34 is inflatable by means of compressed air, and it is launched from and retrieved onto the deck of the ice-breaker 10 by means of a fork or an auxiliary reel 35 in the stern. The oil recovery apparatus 33 is a floating robotic skimmer.

An auxiliary vessel 36 tows the offshore boom 34 from its end such that the oil in the water is collected in the space between the hull 11 of the ice-breaker 10 and the offshore boom 34. The oil recovery apparatus 33 floating in the water pumps the oil in the water into a tank 24 in the hull 11 of the ice-breaker 10, the tank being converted from a heeling tank into an oil recovery tank according to the invention.

The offshore boom is kept in reels on the aft deck of the ship 10. The boom 34 is spread out on the deck and its floaters are filled with compressed air. The boom 34 is conveyed into the sea through a protective reel 35 located on a towing fork. After this, the auxiliary vessel 36 collects the end of the boom 34 from the water and gradually tows the boom as it is being inflated. Once the entire boom 34 is inflated the end of it closest to the ship 10 is attached to the side of the ship and the auxiliary vessel 36 tows the other end of the boom 34 towards the side of the ship in the shape of the letter J such that the oil remains between the boom 34 and the hull 11 of the ship 10.

After this, an offshore oil collector 33, such as a skimmer, is lifted into the water by the crane of the ship. The collector can be operated remotely and has its own propulsion apparatus. The collector 33 has a pump and a hose by means of which the recovered oil is transferred into the tank 24 of the anti-roll system of the ship 10.

The tank 24 of the embodiment shown in FIG. 5 also contains, as in FIG. 4, warm water onto which the recovered oil is pumped. The tank 24 furthermore has steam heat pipes 29 for separating oil and water from each other. As the oil rises to the top in the tank 24, the water is pumped into another tank 22 from the bottom of the tank 24. If the water still contains too much oil, the separation process is continued by pumping water from the bottom of the tank 22 into the next separation process tank, as shown in subsequent figures.

Figure 6:
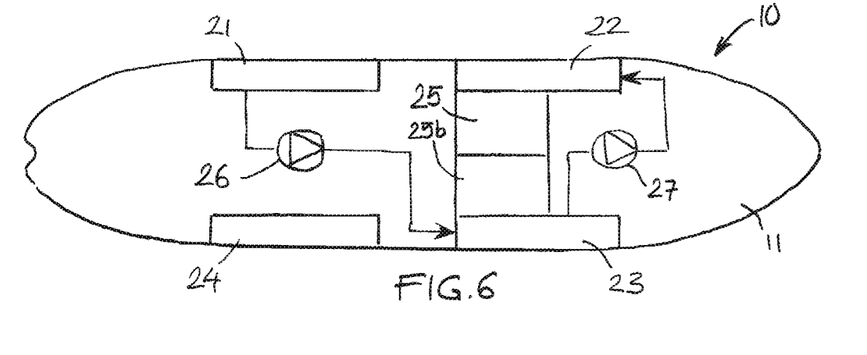
FIG. 6 is a top view of an ice-breaker according to the invention and the first stage in an oil processing diagram.

FIG. 6 shows a top view of the first stage of an oil separation process used in the ice-breaker 10 according to the invention. The ice-breaker 10 of FIG. 6 is shown with six tanks 21, 22, 23, 24, 25 and 25b, of which four, 21, 22, 23 and 24, are most advantageously tanks of the anti-roll system modified so as to be suitable for oil recovery. The other tanks 25 and 25b shown in FIG. 6 are for heavy fuel oil used as fuel for the ship. Ice-breakers ordinarily have anti-roll system tanks which are connected with one another by means of water pipes. The equipment includes one or several water pumps for transferring water from one heeling tank into another. However, the tanks have been modified according to the invention such that they can be used for recovering and/or separating oil. In this use the water pipes between the tanks of the ballast and/or anti-roll system and the related water pumps are bypassed for the duration of oil recovery using other pipes and pumps. Thus, the water pipes connected with the tanks used for anti-roll and/or anti-heeling or heeling action can be closed by means of blind flanges, for example. For oil recovery purposes, the heeling tanks are joined with one another by means of piping, i.e. oil recovery piping. The piping of the oil recovery system can in this way form a parallel piping system to be used for oil recovery operations. In ice-breaking duties, the oil recovery piping can correspondingly be shut out, and the tanks are again used, by means of water fed into the tanks, for anti-roll or heeling purposes.

In the example of FIG. 6, the oil recovery piping includes two pumps 26 and 27, which are most advantageously screw pumps equipped with stepless control, and the pipes between the tanks, which lend themselves for recovering and separating oil. For the sake of clarity, the diagram in FIG. 6 does not show all of the pipes and valves. Most advantageously, each tank is connected with at least one pipe and valve by means of which water and/or oil can be transferred from one tank into another. The two pumps 26 and 27 and the piping connecting the tanks are sufficient for handling the entire oil recovery process shown below in FIGS. 6 to 9, comprised of the oil recovery and/or separation of the oil from water. Most advantageously, all of the modified tanks or at least some of them have steam heat pipes for separating the oil from water even more effectively.

The first tank 21 shown in FIG. 6 is an oil recovery and separation tank according to the invention modified from a tank of the anti-roll system of the ice-breaker 10. The tank 21 contains warm water and steam heat piping. When oil to be recovered from water and the water carried in with it are channelled into the first tank 21, onto the warm water, the oil will separate from the water and rise to the surface. Water separated onto the bottom of the tank 21 is pumped by means of the pump 26 to the next tank 23 in the treatment process. The water to be pumped can contain some oil. When the tank 23 is full and the water and oil contained in it have separated, water is pumped out of the bottom of the tank 23 into the tank 22.

Figure 7:
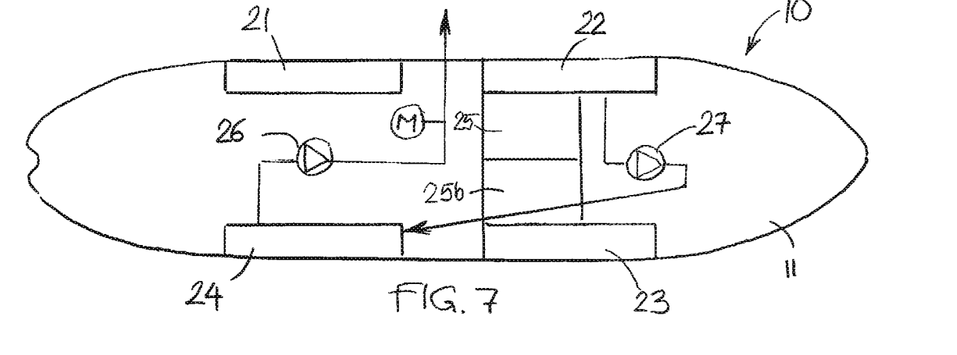
FIG. 7 corresponds to FIG. 6 and shows the second stage in the oil processing diagram.

FIG. 7 shows the second stage in the oil processing diagram, where water is pumped from the tank 22 into the next tank 24. In this stage of the oil separation process, the tank 24 already contains very clean water that can be pumped back into the water. However, an oil content meter 28 is used to verify that the oil content of the water to be pumped back into the water is less than 15 ppm.

Figure 8:
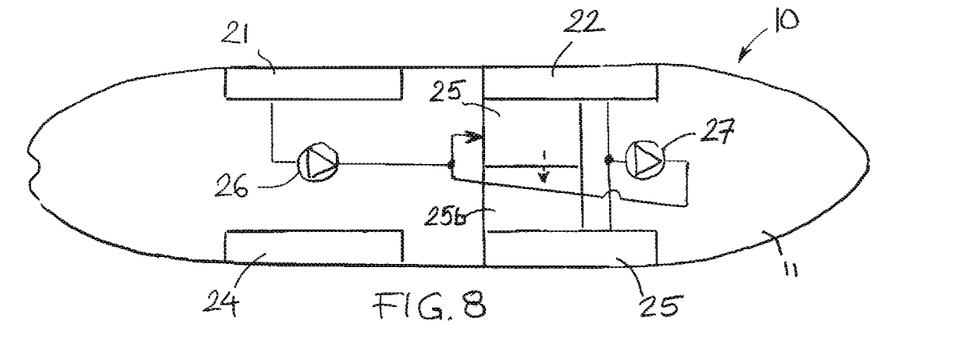
FIG. 8 corresponds to FIG. 6 and shows the third stage in the oil processing diagram.

FIG. 8 shows the third stage of the oil treatment process. In this situation, water has been pumped out of the tanks 21, 22, 23 and 24, and the tanks 21, 22 and 23 only contain oil which is pumped into the fifth tank 25 and the sixth tank 25b, which originally were intended for heavy fuel oil used as fuel by the ice-breaker 10.

Figure 9:
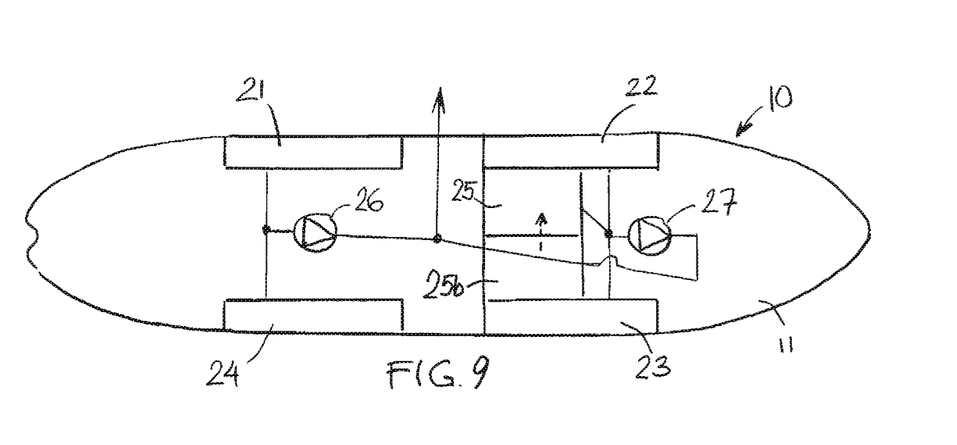
FIG. 9 corresponds to FIG. 6 and shows the fourth stage in the oil processing diagram.

FIG. 9 shows the fourth stage in the oil processing diagram where all of the six tanks 21, 22, 23, 24, 25 and 25b are full of oil. The tanks then either have to be emptied into another vessel or the ice-breaker 10 must call a port to empty the tanks. For emptying, the outlet pipe located in the side of the vessel has an adaptor for the international shore connection seen with a shut-off valve or a shut-off flange. After the emptying, the process illustrated in FIGS. 6 to 9 is restarted.

Figure 10:
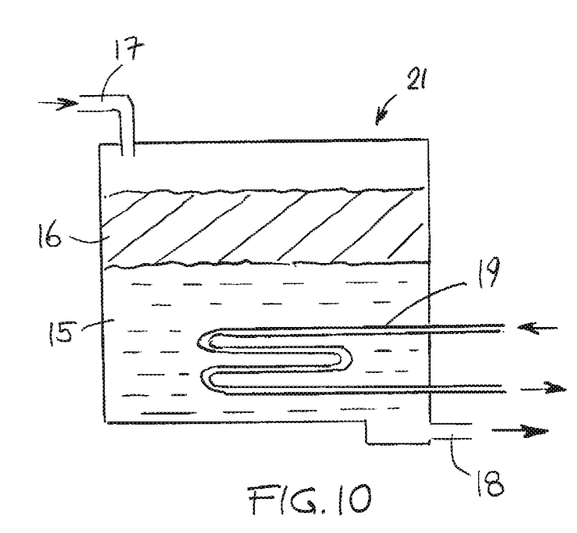
FIG. 10 is a cross-sectional view of a ballast tank or a heeling tank in an ice-breaker according to the invention.

FIG. 10 shows a cross-section of an oil recovery and separation tank 21 modified according to the invention from a tank of an ice-breaker, such as a tank of an anti-roll system. In FIG. 10, there is warm water 15 obtained from the cooling water of the ship's engines in the bottom of the tank 21, onto which oil recovered by an oil collector from the surface of water and water carried in with it is channelled via an infeed pipe 17. The water 15 in the bottom of the tank 21 is further heated by means of the heating pipes 19, whereby the oil in the tank 21 is decanted and separates from the water and rises to the surface and forms an oil layer 16. After this, water can be pumped out of the tank 21 via the outlet pipe 18 into the next tank in the separation process.

Figure 11:
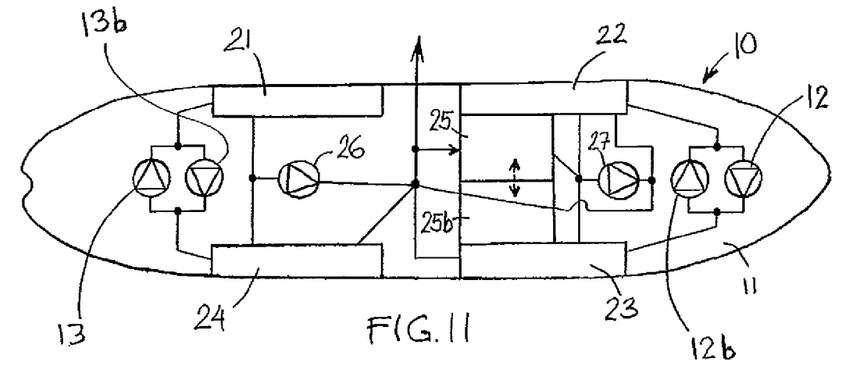
FIG. 11 is a top view of an ice-breaker according to the invention showing the two parallel piping and pumping systems for water and oil.

FIG. 11 is a top view of an ice-breaker 10 according to the invention showing tanks 21, 22, 23, 24, 25 and 25b; pumps 12 and 12a and 13 and 13a used in the anti-roll system and/or heeling system; and pumps 26 and 27 of the piping and pumping system used in an oil separation process as shown in FIGS. 6-9 and described above.

ADDITIONAL NOTES

It is obvious to a person skilled in the art that the different embodiments of the invention may vary within the scope of the claims presented below. It is essential for the invention that an ice-breaking vessel is used for oil recovery, with no specific cargo tank for the oil to be recovered. According to the invention, the tanks of the anti-roll and/or heeling system of the ice-breaking vessel are used as primary tanks when responding to an oil spill, for oil recovery and/or separation of the oil from water. Depending on the equipment of the ship, other suitable tanks can also be used, such as the heavy fuel oil tank of the ship or the ballast tanks, if they are suitable for oil recovery. However, using the tanks for oil recovery usually requires the installation of heating piping in the tanks, particularly during the cold season, such as in winter service. By means of the invention, an ice-breaker can be modified into a multi-purpose vessel applicable as an oil spill response vessel, both in icy conditions and open water, in addition to assisting ships in ice. Because ice-breakers always have several anti-roll and/or heeling system tanks they can also be used for decanting of the recovered oil, i.e. for the separation of oil from water.

An oil spill response system according to the invention can be built in existing ice-breakers such that, most advantageously, the tanks of the anti-roll system and/or heeling system of the vessel are connected with one another by means of an additional, parallel pipe and pump system. Thus the ice-breaker can be converted into an oil spill response vessel simply by starting to use the tanks of the anti-roll and/or heeling system and the ship's reserve oil recovery piping system connecting the tanks for oil recovery purposes. Correspondingly, the vessel can again be used solely as an ice-breaker such that the ballast tanks and/or heeling tanks are cleaned, and the water piping and pumps connecting them is taken into use. In some cases it may be possible to use the same pipes for both purposes, but generally that is not practicable because feeding water into the tanks to heel the ship and, on the other hand, recovering oil or water mixed with oil and separating them from one other take place in different processes. It can also be difficult to clean the oil from the piping.

A double piping system according to the invention can also be built in new ships, whereby the new ice-breaker is also ready to serve as an oil spill response vessel. The same tanks can be utilized for both modes of operation, merely the piping and pump system is switched when the mission is changed. Because the tanks take up a large amount of space on the ship, the multiple roles of the tanks make it possible to always utilize the spaces efficiently even if their purpose is changed as required.

LIST OF REFERENCE NUMBERS

10 Ice-breaker
11 Hull
12 Pump
12b Pump
13 Pump
13b Pump
15 Water
16 Oil
17 Infeed pipe
18 Outlet pipe
19 Heating pipe
21 Anti-roll tank
21b Tank
22 Anti-roll tank
22b Tank
23 Anti-roll tank
23b Tank
24 Anti-roll tank
24b Tank
25 Fuel tank
25b Fuel tank
26 Pump
27 Pump
28 Meter
29 Heating pipe
31 Oil recovery apparatus
32 Oil recovery apparatus
33 Oil recovery apparatus
34 Boom
35 Auxiliary reel
36 Auxiliary vessel

The invention claimed is:

1. A method for recovering and/or processing oil to be recovered from water, which method comprises:
providing an ice-breaker or ice-breaking vessel, the ice-breaker or ice-breaking vessel having a single hull, an anti-roll system and/or a heeling system including one or more pairs of tanks located inside said hull on opposite sides thereof, a first set of connecting pipes for transferring water and air between tanks of the anti-roll system and/or a heeling system, and one or more water pumps connected to the water pipes between the tanks of the anti-roll system and/or a heeling system for pumping water from one tank into another to heel the vessel;
installing a parallel oil piping system and valves and oil pumps suitable for the recovery, separation and transfer of oil between the tanks of the anti-roll system and/or of the heeling system;
closing the first set of connecting pipes and the one or more water pumps connected to the water pipes between the tanks of the anti-roll system and/or a heeling system; and
collecting the oil to be recovered from water by an oil recovery apparatus and pumping the oil by means of the parallel oil piping system and oil pumps into tanks of the anti-roll system and/or tanks of the heeling system.

2. The method according to claim 1, wherein recovered oil and/or water carried in with the oil is transferred in the ice-breaker or ice-breaking vessel from a tank of the anti-roll system and/or from a tank of the heeling system into another corresponding tank of the anti-roll system and/or tank of the heeling system to separate the oil from the water.

3. The method according to claim 1, wherein
warm water is channeled into a first tank of the anti-roll system and/or tank of the heeling system of the ice-breaker or ice-breaking vessel, onto which warm water the oil recovered from a surface of the water and water carried in with it is fed, and
when the recovered oil has separated from the water and risen to a surface in the first tank, water is drained via the bottom into another tank of the anti-roll system and/or tank of the heeling system.

4. The method according to claim 1, wherein
water and oil are separated in the ice-breaker or ice-breaking vessel in several sequential stages such that water is channeled from the bottom portion of a first tank of the anti-roll system and/or tank of the heeling system into a second tank of the anti-roll system and/or tank of the heeling system, and
after that, water is channeled from a bottom portion of the second tank of the anti-roll system and/or tank of the heeling system into a third tank of the anti-roll system and/or tank of the heeling system.

5. The method according to claim 1, wherein oil and/or water carried in with the oil fed into a tank of the anti-roll system and/or tank of the heeling system in the ice-breaker or ice-breaking vessel is heated by means of steam or hot water, after which the oil and/or water carried in with the oil is transferred into a next tank of the anti-roll system and/or tank of the heeling system.

6. An ice-breaker or an ice-breaking vessel to be used for both ice-breaking purposes and for recovering and/or processing oil to be recovered from water, the ice-breaker or an ice-breaking vessel having a single hull and comprising:
an anti-roll system and/or a heeling system including one or more pairs of tanks located inside said hull on opposite sides thereof;
a first set of connecting pipes for transferring water and air between tanks of the anti-roll system and/or a heeling system, and one or more water pumps connected to the water pipes between the tanks of the anti-roll system and/or a heeling system for pumping water from one tank into another to heel the vessel;
a parallel oil piping system and valves and oil pumps suitable for the recovery, separation and transfer of oil between the tanks of the anti-roll system and/or of the heeling system and connected to the tanks of the anti-roll system and/or of the heeling system;
closing means or blind flanges for closing the water pumps and the water pipes connecting the tanks of anti-roll system and/or heeling system when the ice-breaker or an ice-breaking vessel is used for recovering and/or processing oil to be recovered from water; and an oil recovery apparatus for collecting the oil to be recovered from water and pumping the oil via the parallel oil piping system and oil pumps into tanks of the anti-roll system and/or tanks of the heeling system.

7. The ice-breaker or ice-breaking vessel according to claim 6, wherein the oil recovery apparatus includes a pump and a hose or pipe to recover and feed oil into a tank of the anti-roll system and/or into a tank of the heeling system of the ice-breaker.

8. The ice-breaker or ice-breaking vessel according to claim 6, wherein a modified tank of the anti-roll system and/or tank of the heeling system has a heating system for separating oil from water.

9. The ice-breaker or ice-breaking vessel according to claim 6, further comprising an oil containment boom and wherein a stern portion of the ice-breaker or an ice-breaking vessel has an auxiliary reel for launching and retrieval from the water of the oil containment boom.

\* \* \* \* \*